United States Patent

Komoda et al.

[11] Patent Number: 4,725,482
[45] Date of Patent: Feb. 16, 1988

[54] PERPENDICULAR MAGNETIC RECORDING MEDIUM

[75] Inventors: Tomohisa Komoda; Mamoru Ishizuka; Shuhei Tsuchimoto, all of Nara; Mitsuhiko Yoshikawa, Ikoma, all of Japan

[73] Assignee: Sharp Kabushiki Kaisha, Osaka, Japan

[21] Appl. No.: 685,838

[22] Filed: Dec. 24, 1984

[30] Foreign Application Priority Data

Dec. 27, 1983 [JP] Japan ................. 58-249983

[51] Int. Cl.⁴ .............................................. G11B 5/72
[52] U.S. Cl. ................................. 428/215; 204/192.2; 204/192.22; 204/192.23; 427/131; 427/132; 428/216; 428/336; 428/694; 428/695; 428/900; 428/69 B; 428/699; 428/701; 428/472
[58] Field of Search ............... 428/694, 695, 900, 336, 428/216, 698, 699, 701, 472; 427/38, 131, 132; 204/192.22, 192.23, 192.2

[56] References Cited

U.S. PATENT DOCUMENTS

| | | | |
|---|---|---|---|
| 3,498,837 | 3/1970 | Alstad | 428/694 |
| 4,268,369 | 5/1981 | Barlow | 427/131 |
| 4,272,563 | 6/1981 | Steck | 427/131 |
| 4,307,156 | 12/1981 | Yangisawa | 428/694 |
| 4,390,562 | 6/1983 | Yanagisawa | 427/131 |
| 4,454,195 | 6/1984 | Fukuda | 428/694 |
| 4,495,242 | 1/1985 | Arai | 428/900 |
| 4,537,832 | 8/1985 | Kohmoto | 427/131 |
| 4,565,734 | 1/1986 | Arai | 428/695 |
| 4,581,245 | 4/1986 | Nakamura | 427/131 |
| 4,675,240 | 6/1987 | Weiss | 428/694 |

FOREIGN PATENT DOCUMENTS 0258727 12/1985 Japan ................ 428/328

OTHER PUBLICATIONS

Journal of Magnetism and Magnetic Materials 35, (1983) 286–288.

*Primary Examiner*—Ellis P. Robinson
*Attorney, Agent, or Firm*—Birch, Stewart, Kolasch & Birch

[57] ABSTRACT

A Co-Cr perpendicular magnetic recording medium includes a chromium oxide film formed on a Co-Cr perpendicular magnetization film, and a $SiO_2$ protective film formed on the chromium oxide film. The chromium oxide film is formed by conducting a heating treatment to the surface of the Co-Cr perpendicular magnetization film in an oxygen atmosphere of about $10^{-4}$ to $10^{-3}$ Torr, at a temperature of about 300° C. to 400° C. for about two hours. The chromium oxide film has a thickness of about 20 to 200 Å. The $SiO_2$ protective film has a thickness greater than 50 Å, but the total thickness of the chromium oxide film and the $SiO_2$ protective film is selected between 70 and 300 Å.

8 Claims, 2 Drawing Figures

PERPENDICULAR MAGNETIC RECORDING MEDIUM

BACKGROUND OF THE INVENTION

1. Field of the Invention

The present invention relates to a perpendicular magnetic recording medium.

2. Description of the Prior Art

Recently, a perpendicular magnetic recording medium has been developed which forms residual magnetization in a direction perpendicular to the surface of the recording medium. The perpendicular magnetic recording medium ensures high recording density. The conventional perpendicular magnetic recording medium generally includes a film base or an aluminum base, and a Co-Cr film formed on the base by a sputtering method or an electron beam evaporation (E.B. evaporation) method. However, the conventional perpendicular magnetic recording medium does not have a smooth slide against a magnetic head. Thus, the perpendicular magnetic recording medium and/or the magnetic head is damaged during operation, and the conventional perpendicular magnetic recording medium does not have a desirable durability.

In order to protect the Co-Cr metal thin-film from being damaged, (in the conventional perpendicular magnetic recording medium), a protective layer such as a Ni-P film, SiO film, $SiO_2$ film or a noble metal (Au, Rh, Pt, Ag, etc.) film is formed on the Co-Cr metal thin-film through the use of, for example, a plating method, a sputtering method, or an evaporation method. The protective layer can alternatively be an oxide layer or a nitride layer formed on the Co-Cr metal thin-film, or an organic silicon compound film painted on the Co-Cr metal thin-film. However, a suitable thickness for the protective layer is difficult to determine in the conventional perpendicular magnetic recording medium. If the it is thick, the protective layer creates a spacing loss which reduces the recording density, and deteriorates the reproduction output. If the protective layer is thin, the recording density can be enhanced, but the perpendicular magnetic recording medium and/or the magnetic head is damaged during operation, and the perpendicular magnetic recording medium does not have a satisfactory durability.

OBJECTS AND SUMMARY OF THE INVENTION

Objects of the Invention

Accordingly, an object of the present invention is to provide a novel perpendicular magnetic recording medium which ensures a high density recording, and has a satisfactory durability.

Another object of the present invention is to provide a protective layer on a Co-Cr metal thin-film, which ensures a high density recording, and a smooth relative movement between the perpendicular magnetic recording medium and a magnetic head.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, a Co-Cr perpendicular magnetic film is formed on a substrate by an RF-sputtering method. A chromium oxide film is formed on the Co-Cr perpendicular magnetic film to a thickness of about 50 Å by performing a heating treatment to the surface of the Co-Cr perpendicular magnetic film for two hours in an oxygen atmosphere of $10^{-4}$ through $10^{-3}$ Torr and temperature of 300° C. through 400° C. A $SiO_2$ film of about 200 Å thick is formed on the chromium oxide film. The total thickness of the chromium oxide film and the $SiO_2$ film is thin enough to ensure high density recording, and the chromium oxide film and the $SiO_2$ film function, in combination, to protect the Co-Cr perpendicular magnetic film from being damaged.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

A perpendicular magnetic recording medium of the present invention includes a substrate 1 such as a film base or an aluminum base. A Co-Cr perpendicular magnetic film 2 is formed on the substrate 1 by, for example, RF-sputtering. A chromium oxide film 3 is formed on the Co-Cr perpendicular magnetic film 2 by conducting a heat treatment to the surface of the Co-Cr perpendicular magnetic film 2. The heat treatment is conducted in an oxygen atmosphere of $10^{-4}$ through $10^{-3}$ Torr and at a temperature of 300° C. to 400° C. for about two hours. The chromium oxide film 3 has a thickness of about 50 Å. A $SiO_2$ film 4 of about 200 Å thick is formed on the chromium oxide film 3 for protection purposes.

Figure 1:
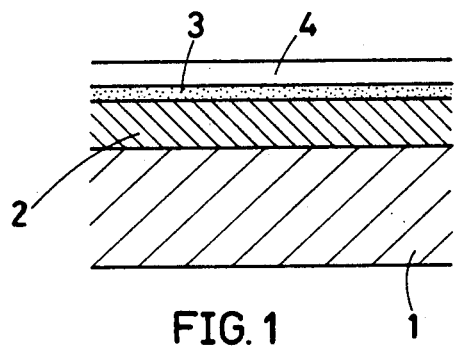
FIG. 1 is a sectional view of an essential part of an embodiment of a perpendicular magnetic recording medium of the present invention.

The following TABLE I shows conditions when a magnetic head is relatively moved on the surface of various types of perpendicular magnetic recording mediums. Perpendicular magnetic recording mediums A, B, C and D have $SiO_2$ layers of different thicknesses, but do not have the chromium oxide layer formed by the heat treatment. The perpendicular magnetic recording medium E has the chromium oxide layer, but does not have the $SiO_2$ protective layer. The perpendicular magnetic recording medium F is the embodiment of the present invention which has been described above with reference to FIG. 1.

TABLE I

| MEDIUM | $SiO_2$ | SLIDING NOISE | DAMAGES | ENVELOPE |
|---|---|---|---|---|
| A | 1000Å | No | No | Good |
| B | 700Å | No | No | Good |
| C | 200Å | Exist | Exist | Medial |

TABLE I-continued

| MEDIUM | SiO$_2$ | SLIDING NOISE | DAMAGES | ENVELOPE |
| --- | --- | --- | --- | --- |
| D | 0 | Exist | Exist | Bad |
| E | 0 | No | No | Good |
| F | 200Å | No | No | Good |

The "Envelope" means the variation of the condition of the peak value of a reproduction signal obtained from the magnetic head. The term "Good Envelope" means a stable peak value of a reproduction signal, that is, stable reproduction operation.

It will be clear from TABLE I that the smooth sliding is ensured only when the SiO$_2$ protective layer is considerably thick (mediums A and B) when the heating treatment has not been conducted to the Co-Cr perpendicular magnetic film. The recording medium A having the SiO$_2$ protective layer of a thickness of 1000 Å ensures a stable reproduction operation even after 400,000 passes of the magnetic head travel. The recording medium C having a thin SiO$_2$ protective layer and the recording medium D having no SiO$_2$ protective layer do not show a smooth traveling of the magnetic head on the perpendicular magnetic recording medium. It is assumed that, when the heating treatment has not been conducted to the Co-Cr perpendicular magnetic film, the SiO$_2$ protective layer must be thicker than about 700 Å in order to obtain a desirable durability. On the other hand, the recording medium E to which the heating treatment has been conducted, but which does not have the SiO$_2$ protective layer generates the sliding noise when the magnetic head slides on the surface of the recording medium E, and the envelope of the reproduced signal is deteriorated as the reproduction operation is repeatedly conducted. That is, the chromium oxide film alone does not provide a desirable durability.

The recording medium F of the present invention does not generate the sliding noise, does not permit any damages to the magnetic head and the recording medium, and ensures a good envelope for a long time even though the SiO$_2$ protective layer is considerably thin. Further, the recording medium F shows a similar durability as the recording medium A. It is assumed that the chromium oxide layer and the SiO$_2$ protective layer function, in combination, to ensure stable operation.

Figure 2:
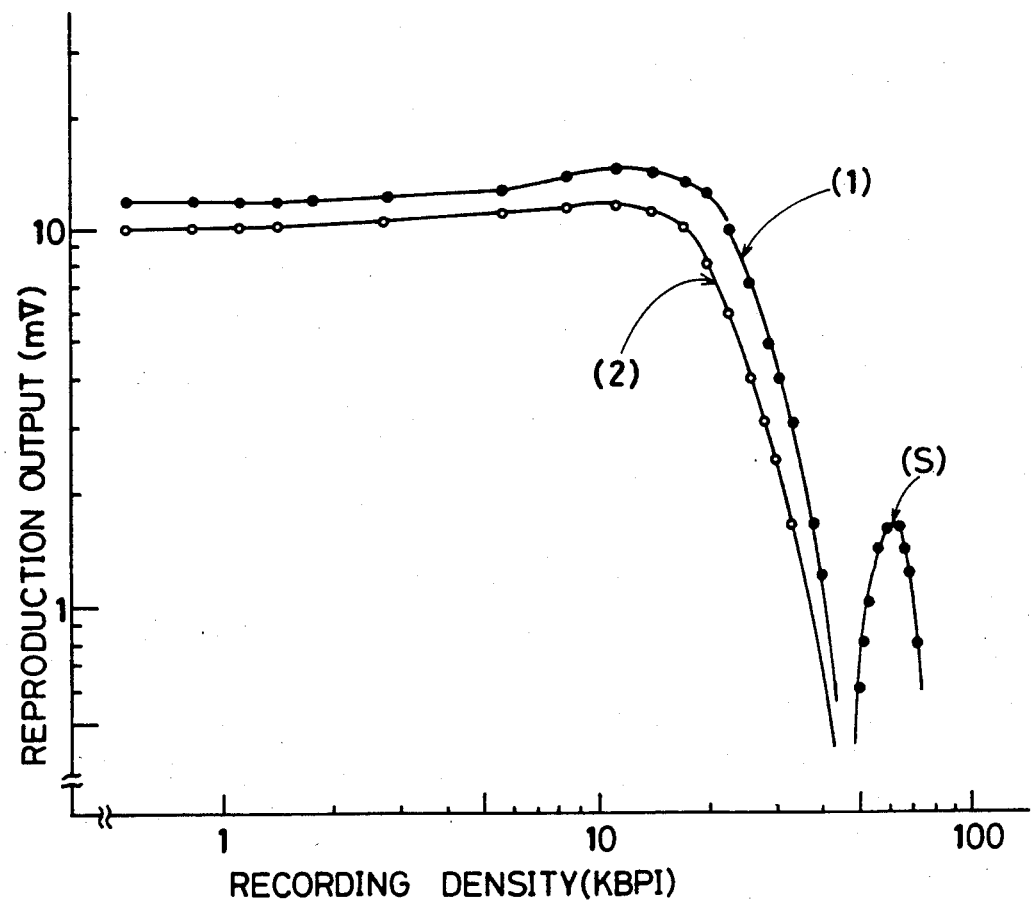
FIG. 2 is a graph for explaining recording density characteristics of the perpendicular magnetic recording medium of FIG. 1.

The recording density of the recording medium F of the present invention is compared with the recording density of the recording medium A, which does not have the chromium oxide layer, through the use of a ring head of the gap length 0.7 μm. In FIG. 2, a curve (1) represents the recording density characteristic of the recording medium F of the present invention, and a curve (2) represents the recording density characteristic of the recording medium A. It is clear from FIG. 2 that the high frequency characteristic deteriorates in recording medium A because of the spacing loss created by the thick SiO$_2$ protective layer. The second peak (S) becomes low and the reproduction output level becomes low at high recording density as the SiO$_2$ protective layer becomes thick. In the recording medium A, the second peak is hardly observed. The recording medium F of the present invention shows a high second peak and a good high frequency characteristic because the total thickness of the SiO$_2$ protective layer and the chromium oxide layer is small and the spacing loss is minimized.

That is, the recording medium F of the present invention has a similar durability as the recording medium A.

Further, the recording characteristic of the recording medium F of the present invention is superior to that of the recording medium A.

In a preferred form, to ensure a good durability and a good recording characteristic, the chromium oxide layer should have a thickness between 20 through 200 Å. The SiO$_2$ protective layer must be thicker than 50 Å, and the total thickness of the chromium oxide layer and the SiO$_2$ protective layer should be selected between 70 Å and 300 Å. The SiO$_2$ protective layer and the chromium oxide layer provide, in combination, a good durability. The total thickness of the chromium oxide and the SiO$_2$ protective layer is thin enough to minimize the spacing loss and to ensure a high recording density and a good reproduction characteristic. The proteclayer can be a SiO film, or a Si$_3$N$_4$ film.

The recording density of the recording medium is influenced by the perpendicular magnetic anisotropy of the Co-Cr perpendicular magnetic layer. The present inventors have discovered that the perpendicular magnetic anisotropy of the Co-Cr film is enhanced when the chromium oxide layer is formed on the surface of the Co-Cr perpendicular magnetic film. The function of the chromium oxide layer formed on the Co-Cr perpendicular magnetic film is described in Japanese Patent Laid Open Specification No. (Kokai No.) 58-164018, "METHOD FOR MANUFACTURING A PERPENDICULAR MAGNETIC RECORDING MEDIUM", published on Sept. 28, 1983, and in Journal of Magnetism and Magnetic Materials 35 (1983) 286–288, "PERPENDICULAR ANISOTROPY IN Co-Cr FILMS".

The invention being thus described, it will be obvious that the same may be varied in many ways. Such variations are not to be regarded as a departure from the spirit and scope of the invention, and all such modifications are intended to be included within the scope of the following claims.

What is claimed is:

1. A perpendicular magnetic recording medium having improved recording and reproducing characteristics and durability, which comprises:
    a substrate;
    a Co-Cr perpendicular magnetization film formed on said substrate;
    a chromium oxide film formed on said Co-Cr perpendicular magnetization film; and a protective layer film selected from SiO$_2$, SiO or Si$_3$N$_4$ having a minimal thickness formed on said chromium oxide film to protect said Co-Cr perpendicular magnetization film from being damaged and to ensure stable operation and impart an increase in physical strength to the perpendicular magnetic recording medium;
    wherein the minimal thickness of the protective layer film is greater than 50 Å, but the total thickness of the chromium oxide film and the protective layer film is between 70 Å and 300 Å.

2. The perpendicular magnetic recording medium of claim 1, wherein said chromium oxide film is formed on said Co-Cr perpendicular magnetic film by performing a heat treatment to said Co-Cr perpendicular magnetic film.

3. The perpendicular magnetic recording medium of claim 2, wherein said heat treatment is performed in an oxygen atmosphere of between $10^{-4}$ Torr and $10^{-3}$ Torr, and at a temperature between 300° C. and 400° C., for about two hours.

4. The perpendicular magnetic recording medium of claim 2, wherein said chromium oxide film has a thickness between 20 Å and 200 Å.

5. The perpendicular magnetic recording medium of claim 1, wherein said protective layer film is $Si_3N_4$.

6. The perpendicular magnetic recording medium of claim 1, wherein said Co-Cr perpendicular magnetization film is formed on said substrate by an RF-sputtering method.

7. A perpendicular magnetic recording medium having improved recording and reproducing characteristics and durability, which comprises:
   a substrate;
   a Co-Cr perpendicular magnetization film formed on said substrate;
   a chromium oxide film formed on said Co-Cr perpendicular magnetization film; and a $SiO_2$ protective layer film having a minimal thickness formed on said chromium oxide film which functions in combination with said chromium oxide film to protect the Co-Cr perpendicular magnetization film from being damaged and to ensure stable operation and impart an increase in physical strength to the perpendicular magnetic recording medium;
   wherein the minimal thickness of the $SiO_2$ protective layer film is greater than 50 Å, but the total thickness of the chromium oxide film and the protective layer film is between 70 Å and 300 Å.

8. The perpendicular magnetic recording medium of claim 7, wherein said chromium oxide film has a thickness between 20 Å and 200 Å.

* * * * *